United States Patent [19]

Morinaga

[11] Patent Number: 4,734,898
[45] Date of Patent: Mar. 29, 1988

[54] AUTOCHANGER TYPE DISC PLAYER

[75] Inventor: Kaoru Morinaga, Yokohama, Japan

[73] Assignee: Kabushiki Kaisha Toshiba, Kawasaki, Japan

[21] Appl. No.: 744,677

[22] Filed: Jun. 14, 1985

[30] Foreign Application Priority Data

Jun. 15, 1984 [JP] Japan .................................. 59-123116
Jun. 15, 1984 [JP] Japan .................................. 59-123117

[51] Int. Cl.⁴ ............................................. G11B 17/22
[52] U.S. Cl. ...................................................... 369/39
[58] Field of Search ...................................... 369/36–39

[56] References Cited

U.S. PATENT DOCUMENTS

| 3,967,828 | 7/1976 | Topolski | 369/38 |
| 4,510,591 | 4/1985 | Schatteman | 369/77.1 |
| 4,539,663 | 9/1985 | Ishibashi et al. | 369/39 |
| 4,580,254 | 4/1986 | Hojyo et al. | 369/39 |
| 4,599,716 | 7/1986 | Shimbo | 369/39 |
| 4,633,452 | 12/1986 | Shimbo et al. | 369/36 |

FOREIGN PATENT DOCUMENTS

| 58-164060 | 9/1983 | Japan . |
| 59-82663 | 5/1984 | Japan . |
| 590786 | 1/1945 | United Kingdom . |
| 836099 | 6/1960 | United Kingdom . |
| 1000778 | 8/1965 | United Kingdom . |
| 1122177 | 7/1968 | United Kingdom . |
| 2102184 | 1/1983 | United Kingdom . |

Primary Examiner—Steven L. Stephan
Attorney, Agent, or Firm—Finnegan, Henderson, Farabow, Garrett & Dunner

[57] ABSTRACT

An autochanger type disc player for playing compact audio discs includes a disc storage area able to store a plurality of closely spaced discs, a disc playing mechanism, and a mechanism for transferring a selected disc from the disc storage area to the disc playing mechanism. During transfer of the selected disc from the disc storage area to the disc playing mechanism, the selected disc passes through a disc inlet that includes a restraining member permitting only the selected disc to pass through to the disc playing mechanism and a buffer part preventing the recorded portion of the disc from contacting non-resilient components of the disc player.

15 Claims, 25 Drawing Figures

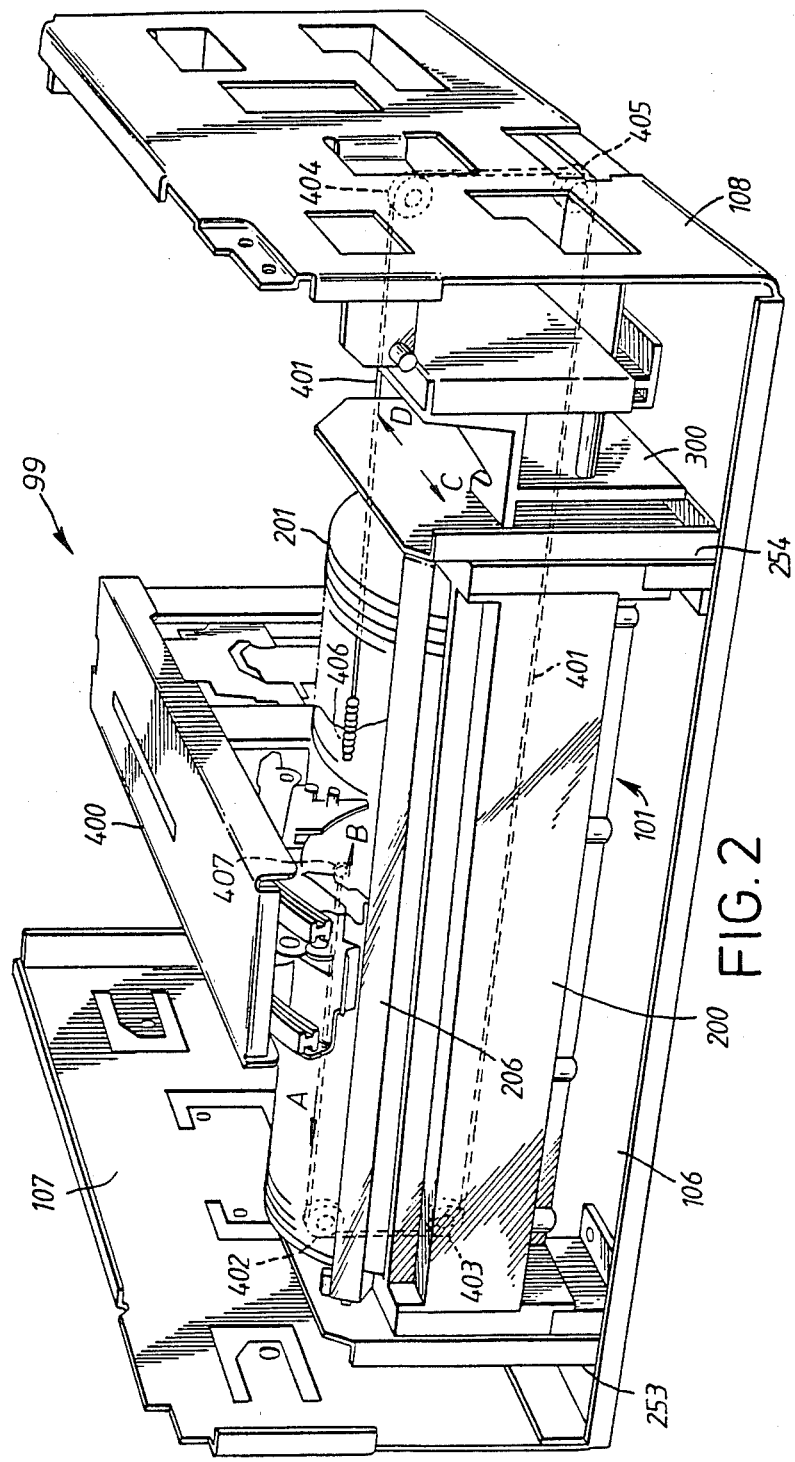

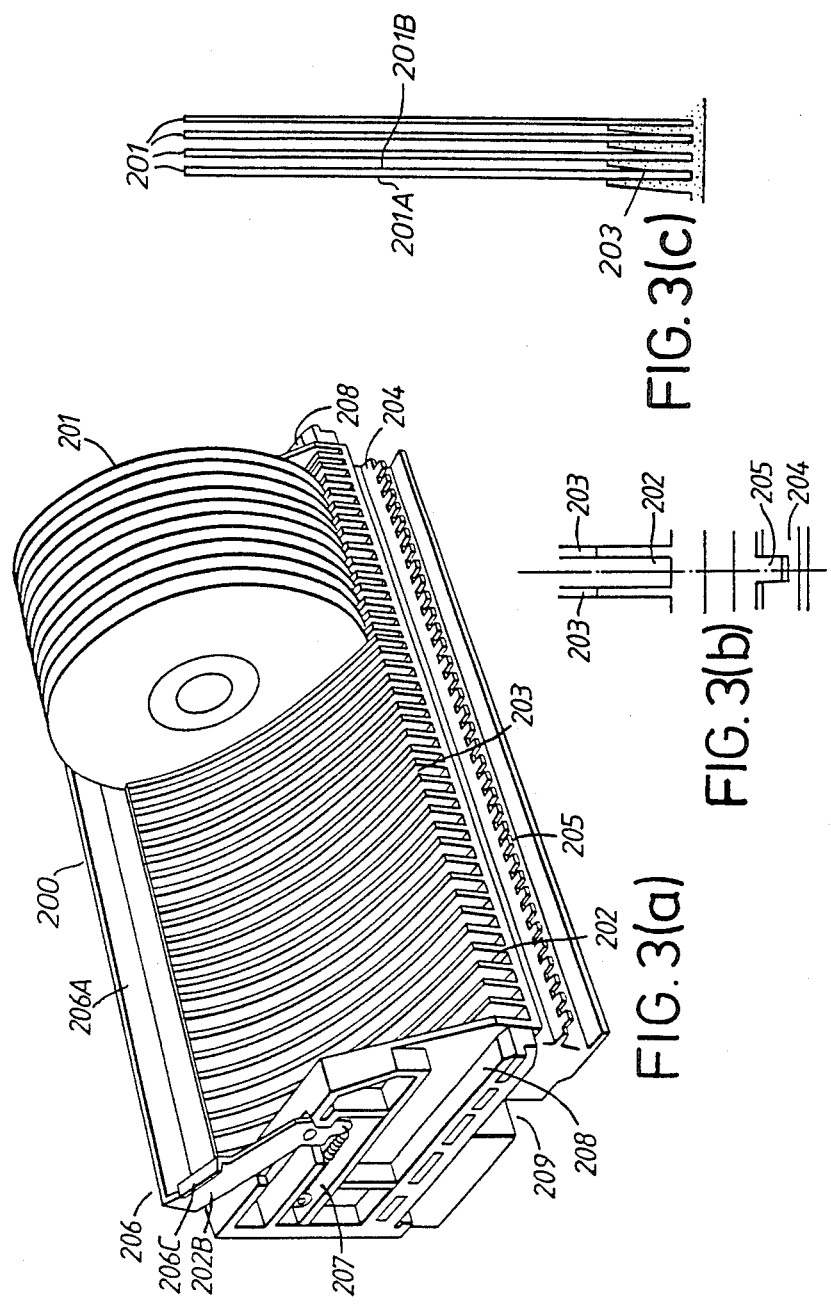

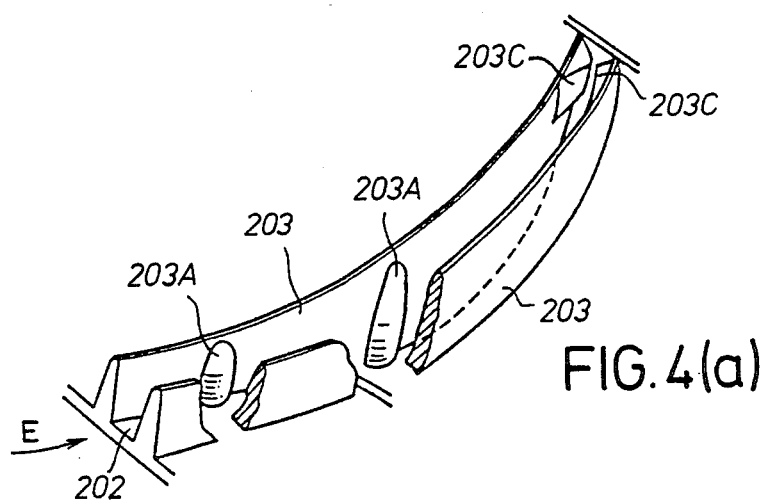
FIG.4(a)
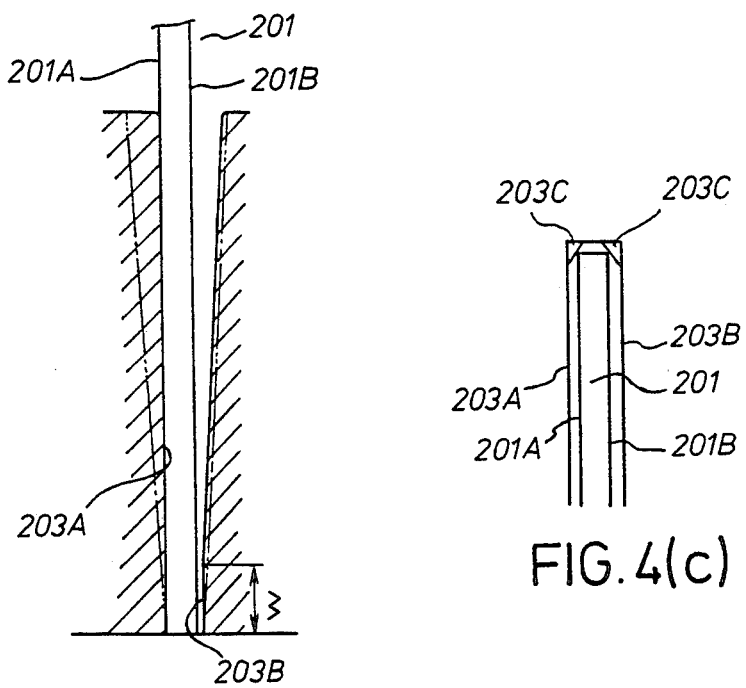
FIG.4(b)
FIG.4(c)

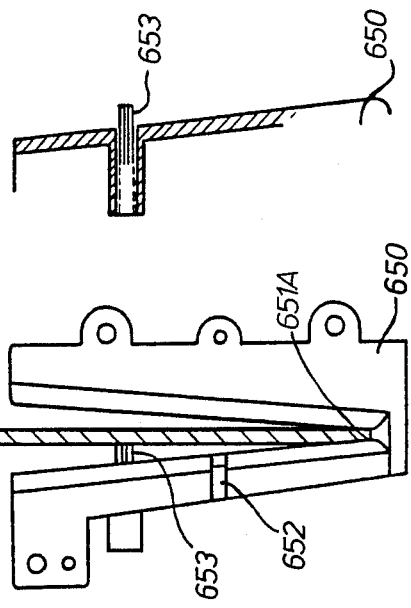
FIG.16(b)
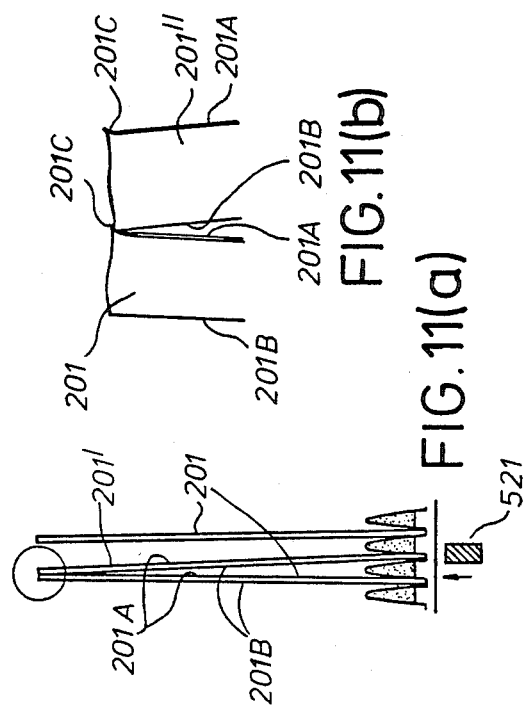
FIG.16(a)
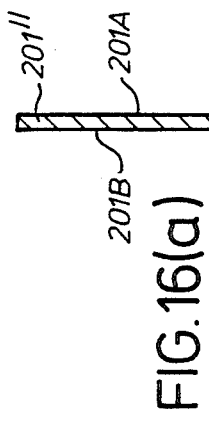
FIG.10
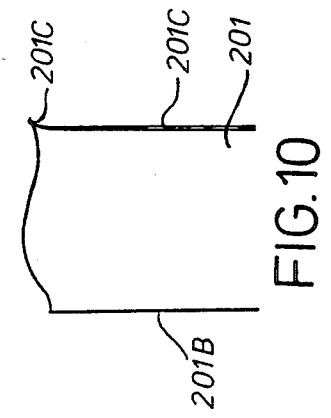
FIG.11(b)
FIG.11(a)

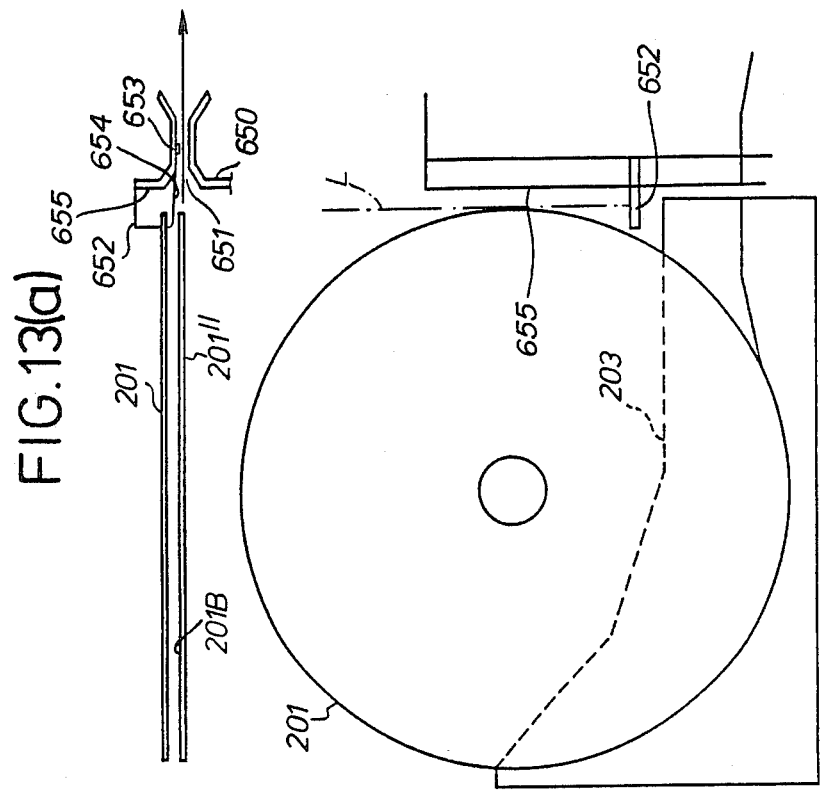
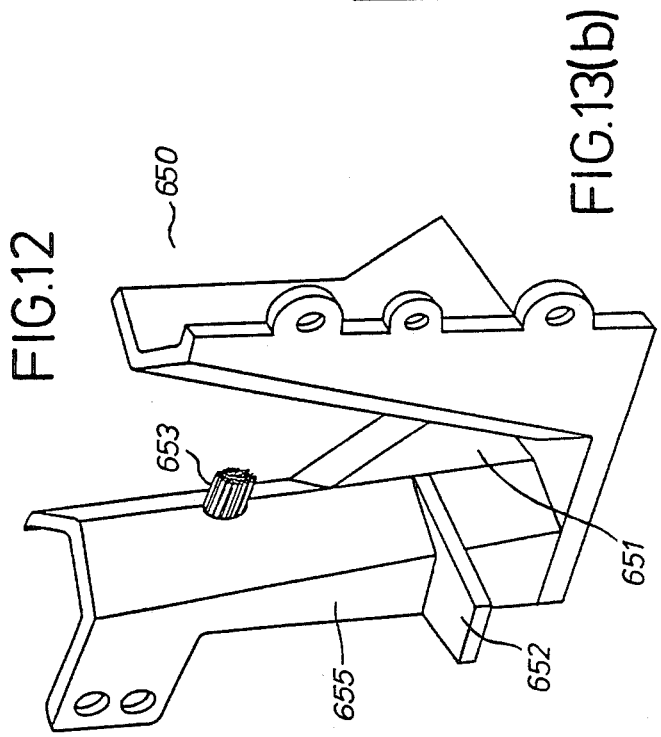

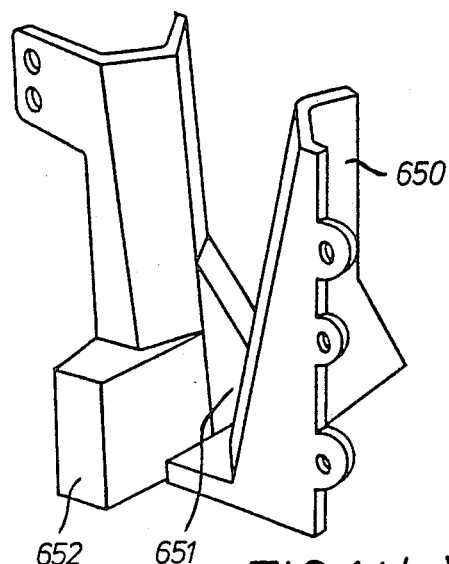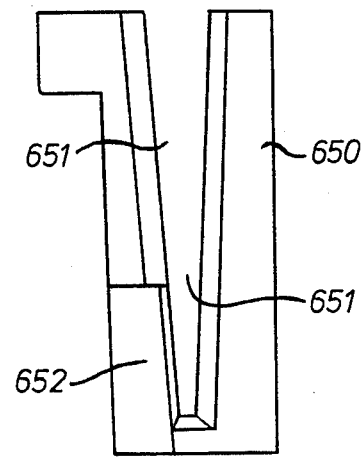
FIG.14(a)    FIG.14(b)
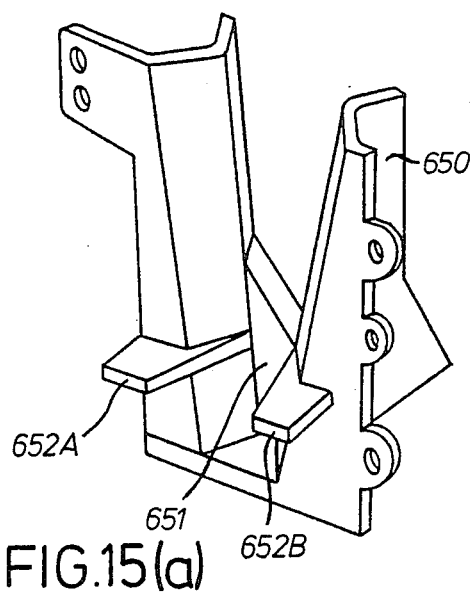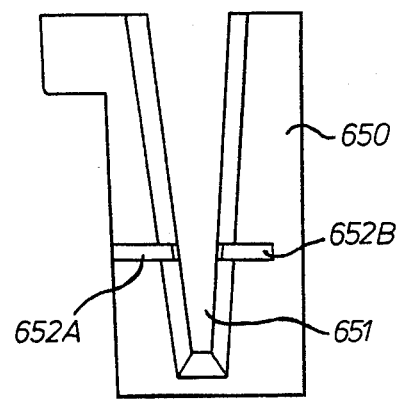
FIG.15(a)    FIG.15(b)

AUTOCHANGER TYPE DISC PLAYER

BACKGROUND OF THE INVENTION

1. Field of the Invention

The present invention relates to the field of disc players capable of selecting and playing, on command, any of a plurality of stored discs and, more particularly, to autochanger type disc players suitable for optical compact discs (CDs).

2. Description of Related Art

Recently, in the field of audio equipment, digital audio playback systems utilizing pulse code modulation (PCM) technology to play back sound as faithfully as possible have been developed. Of these systems, playback systems employing CDs have become especially popular.

The CD conventionally used in a digital audio disc playback system is made from a transparent resin and has a diameter of approximately 12 cm and a thickness of approximately 1.2 mm. The CD has a thin metal film deposited on at least one disc surface, and pits or depressions are formed in the thin metal film. The pits or depressions produce light reflectivities that are different from the reflectivity of the non pitted portions of the metal film and that correspond to 1 or 0 of digitized data. When a signal is read out from a CD, an optical pickup incorporating a semiconductor laser or photoelectric transducing device tracks the information storage area of the CD radially from the center portions toward the outer portions, while the disc is rotated at a variable rotation speed between 200 and 500 rpm to achieve a constant linear velocity at all pickup points.

A CD stores such a large quantity of information that a single side can provide approximately one hour of stereophonic music. A CD is far superior to a conventional analog phonograph record in both sound quality and information storage density.

In view of the excellent characteristics of the CD, it has been suggested to use CDs in automatic multi-disc playback systems for business use, for example, in jukeboxes. It is possible to achieve such a system by using a conventional autochanger type disc player with CDs. Known autochanger type disc players, however, are complex in structure and bulky, partially because they have been designed for use with analog phonograph records. Therefore, the conventional disc players present control problems Another problem is the long time it takes to exchange one disc for another in a conventional disc player. In addition, a pusher-type mechanism normally has been used to move a disc from storage to a playing position. The pusher mechanism passes through the stack of discs, requiring the discs to be separated by relatively wide spaces to accommodate the bulk of the pusher mechanism. For these reasons, if the conventional autochanger type disc player is used with CDs without changing the essential structure of the disc player, numerous problems arise. Hence, the development of an autochanger type disc player suitable for CDs is a matter of intense commercial interest.

In view of the foregoing, the present invention is intended to provide an autochanger type disc player that makes possible an increase in the number of discs that can be accommodated. In addition, the autochanger promotes reliability of operation with a simple construction.

Furthermore, the present invention is intended to provide an autochanger type disc player that is capable of selecting with certainty a predetermined disc among many discs stored close to each other in a disc storage section, transferring the selected disc to a playback section without damaging the disc, and returning the disc to the disc storage section without damage.

Additional advantages of the present invention will be set forth in part in the description that follows and in part will be obvious from that description or can be learned by practice of the invention. The advantages of the invention can be realized and obtained by the apparatus particularly pointed out in the appended claims.

SUMMARY OF THE INVENTION

The present invention overcomes the problems of prior art disc players by providing a autochanger type disc player having means for storing a plurality of closely-spaced discs and means for preventing a plurality of discs from being transferred to the playback apparatus of the disc player from the disc storing means. The present invention also includes means for preventing damage to the recorded surface of the selected disc being transferred between the disc storing means and the playback apparatus.

To overcome the problems of the prior art and in accordance with the purpose of the invention, as embodied and broadly described herein, the autochanger type disc player of the present invention comprises means for storing a plurality of closely-spaced, parallel discs, means for playing the discs, and means for transferring a selected one of the discs from the disc storing means to the disc playing means. The disc transferring means is movable along the plurality of discs in the disc storing means and includes a disc guide having a disc inlet alignable with the selected disc in the disc storing means, the selected disc passing through the disc inlet during transfer of the selected disc from the disc storing means to the disc playing means. The autochanger type disc player of the present invention also comprises restraining means for preventing discs other than the selected disc from moving through the disc inlet, the straining means being connected to the disc guide adjacent the disc inlet.

Preferably, the disc inlet is V-shaped and the restraining means includes a restraining number connected to one side of the disc inlet and positioned above the bottom of the disc inlet by a distance less than the radius of one of the discs, the restraining member projecting from the disc guide toward the disc storing means.

Broadly, the autochanger type disc player of the present invention also comprises means for storing a plurality of closely spaced, parallel discs, means for playing the discs, means for transferring a selected one of the discs from the disc storing means to the disc playing means, and buffer means for preventing the recorded portion of the selected disc from contacting nonresilient portions of the disc player when the selected disc is being transferred from the disc storing means to the disc playing means. The disc transferring means is movable along the plurality of discs in the disc storing means and includes a disc guide having a disc inlet alignable with the selected disc in the disc storing means, the selected disc passing through the disc inlet during transfer of the selected disc from the disc storing means to the disc playing means.

Preferably, the disc inlet is V-shaped and the buffer means includes a resilient buffer part projecting from one side of the disc inlet approximately to the center of the disc inlet, the resilient buffer part being comprised of bristles, felt, or rubber.

The accompanying drawings, which are incorporated in and which constitute a part of this specification, illustrate at least one embodiment of the invention and, together with the description, explain the principles of the invention.

BRIEF DESCRIPTION OF THE DRAWINGS

FIG. 2 is a perspective view of the autochanger type disc player shown in FIG. 1 with the cover removed;

FIG. 3(a) is a perspective view showing the disc storage tray shown in FIG. 2;

FIGS. 3(b) and 3(c) are exploded front and sectional views of the disc holding grooves of the tray shown in FIG. 3(a);

FIGS. 4(a), 4(b), and 4(c) are perspective and sectional views of a disc holding groove of the tray shown in FIG. 3(a);

FIG. 10 is an exploded view of the edge of a compact disc utilized in the disc autochanger of the present invention;

FIGS. 11(a) and 11(b) are views illustrating a possible arrangement of discs in the disc storage tray shown in FIG. 3;

FIG. 12 is a perspective view showing the fixed guide of the disc playback unit of FIG. 8;

FIGS. 13(a) and 13(b) are plan and elevational views showing details of the restraining member of the fixed guide shown in FIG. 12;

FIGS. 14(a) and 14(b) are perspective and elevational views showing a second embodiment of the restraining member of the fixed guide shown in FIG. 12;

FIGS. 15(a) and 15(b) are perspective and elevational views showing a third embodiment of the restraining member of the fixed guide shown in FIG. 12;

FIGS. 16(a) and 16(b) are elevational and sectional views showing details of the buffer part of the fixed guide shown in FIG. 12;

FIG. 17 is an elevational view showing a second embodiment of the buffer part of the fixed guide shown in FIG. 12; and FIG. 18 is an elevational view showing a third embodiment of the buffer part of the fixed guide shown in FIG. 12.

DESCRIPTION OF THE PREFERRED EMBODIMENT

Figure 1:
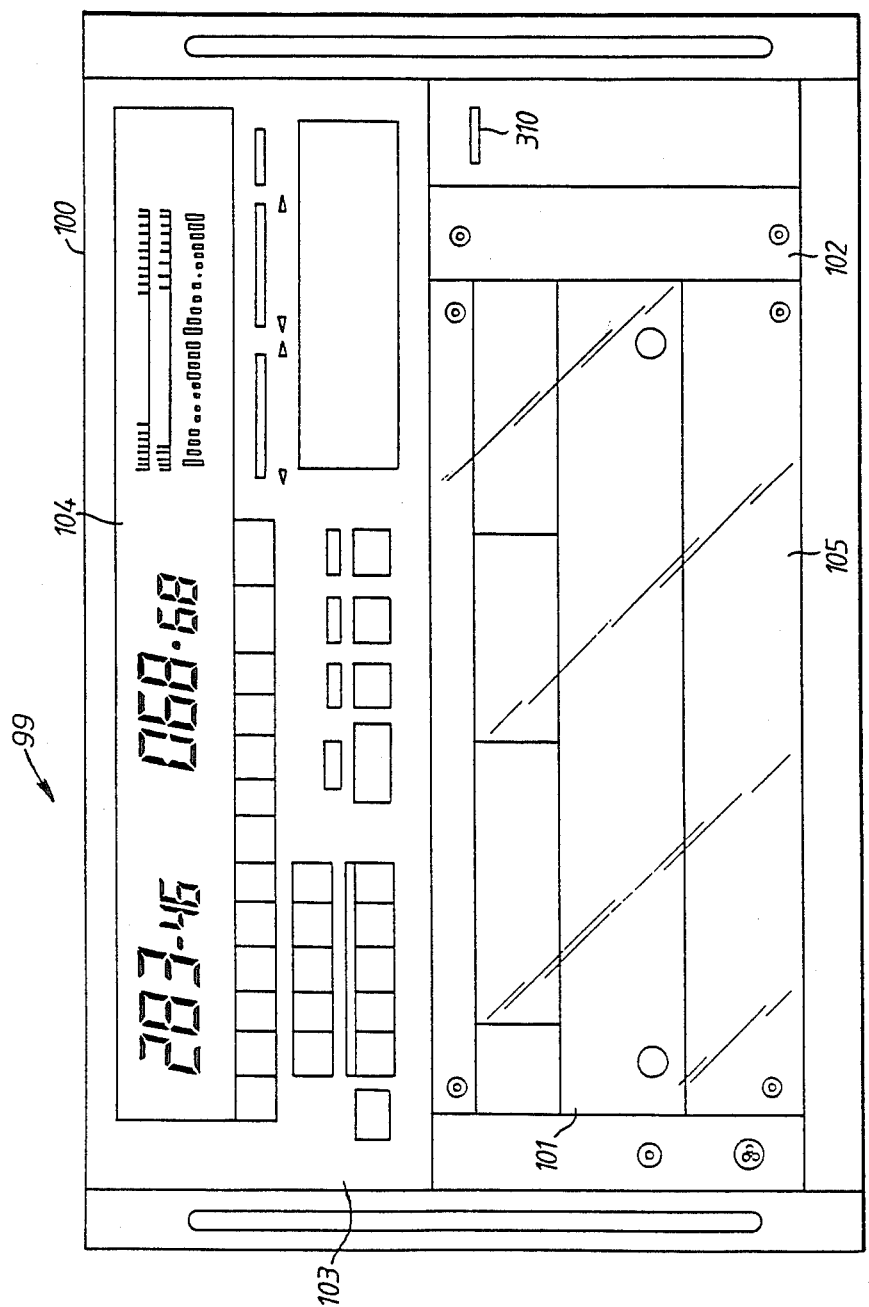
FIG. 1 is a front external view of an autochanger type disc player according to the present invention.

Reference now will be made in detail to the presently preferred embodiments of the invention, examples of which are illustrated in the accompanying drawings. Throughout the drawings, like reference numerals and letters are used to designate like or equivalent elements for the sake of simplicity of explanation.

FIG. 1 shows a front view of autochanger type disc player 99 according to the present invention. The front of housing 100 of disc player 99 includes disc storage section 101, temporary disc loading section 102, operation control section 103, and display section 104. Disc storage section 101 is covered by cover 105. Temporary disc loading section 102 is slidably mounted on housing 100 so as to protrude outwardly from housing 100.

FIG. 2 shows the interior components of autochanger type disc player 99 with housing 100 removed. In accordance with the present invention, disc player 99 includes main chassis 106, left-side chassis 107, and right-side chassis 108. Mounted within the chassis are disc storage section 101, which houses tray 200, temporary disc loading mechanism 300 for temporary disc loading section 102, and disc playback unit 400. Tray 200 is able to store a plurality of compact discs 201 arranged vertically in a row to form an imaginary cylinder having a horizontal axis coinciding with the centers of the discs. Temporary disc loading mechanism 300 is able to store only a single CD. Tray 200 is removable from disc storage section 101 through a port covered by cover 105, so that discs 201 can be loaded into or unloaded from disc storage section 101 as a single unit together with tray 200. The disc in temporary disc loading mechanism 300 is loaded into or unloaded from temporary disc loading mechanism 300 by sliding mechanism 300 into or out of temporary disc loading section 102. In the disc player of the present invention, the disc stored in temporary disc loading section 102 is axially aligned with the discs in tray 200.

Figure 5:
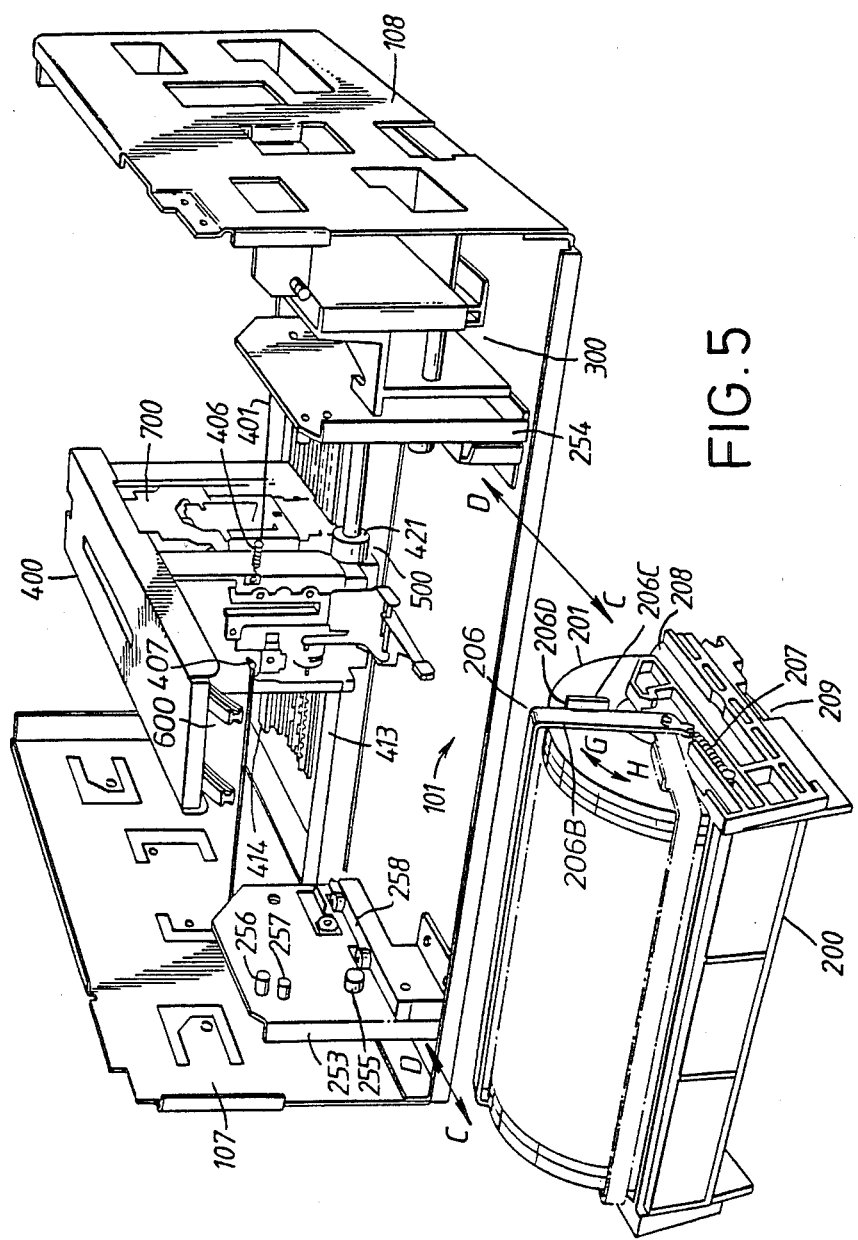
FIG. 5 is a perspective view of the inside of the autochanger type disc player of FIG. 2 with the disc storage tray in its unloaded position.

As shown in FIG. 5, disc playback unit 400 is slidable along the line of discs 201 in tray 200 and includes means for searching and selecting an individual disc for playback, means for playing back the selected disc, and means for transferring the selected disc from tray 200 to the playback means. As embodied herein and depicted in FIG. 5, means for searching and selecting an individual disc for playback includes search mechanism 500, means for playing back the selected disc includes playback mechanism 700, and means for transferring the selected disc from tray 200 to the playback means includes transfer mechanism 600. Disc playback unit 400 is positioned at the disc 201 selected for playback by search mechanism 500, transfer mechanism 600 picks up and transfers the selected disc 201 into playback mechanism 700, and then playback mechanism 700 plays the selected CD 201. After the selected CD is played, transfer mechanism 600 transfers it back to tray 200 in the position where it was stored previously.

FIGS. 3(a), 3(b), and 3(c) show tray 200 in detail. Recessed in the upper part of tray 200 are a plurality of disc holding grooves 202, which are divided from each other by partition walls 203. Each disc holding groove 202 has a curved bottom corresponding in shape to the edge of disc 201 and contacting about one fourth of the circumference of a disc. Tray 200 further includes slotted flange 204 along its front end as seen in FIG. 3(a). In flange 204 are formed a plurality of slots 205 aligned with disc holding grooves 202, as shown in FIG. 3(b). As shown in FIG. 3(c), discs 201 are positioned vertically and parallel to each other in grooves 202. Preferably, each CD has one unrecorded face 201A and one recorded face 201B. Discs 201 are stored in tray 200 so that all recorded faces 201B face in the same direction. Tray 200 also includes disc retention lever 206 pivotally mounted on tray 200. Disc retention lever 206 includes crossbar portion 206A, which is parallel to the axis of the imaginary cylinder formed by discs 201 in tray 200, and a pair of parallel side portions 206B, which extend perpendicularly from the ends of crossbar portion 206A and are pivotally mounted on the side walls of tray 200. Flange 206C is formed on each side portion 206B and protrudes outwardly from its respective side portion. Disc retention lever 206 is biased to pivot in the clockwise direction as seen in FIG. 3(a) by spring 207 mounted between the end of side portion 206B and the side wall of the tray 200. In FIG. 3(a) disc retention lever 206 is shown in a position where it is pivoted against the force of spring 207. Guide groove 208 is formed in each side wall of tray 200. Tray guide rail 209 is formed adjacent and parallel to guide groove 208.

FIGS. 4(a), 4(b), and 4(c) show in detail disc holding grooves 202 and partition walls 203 dividing the grooves from each other. When placed in tray 200, discs 201 sit on the bottoms of grooves 202, which are separated by partition walls 203 preferably dimensioned to separate adjacent discs 201 by a distance approximately equal to the thickness of an individual CD (approximately 1.2 mm). Partition walls 203 are tapered toward their upper ends so that each groove 202 is wider at its opening than at its bottom. A plurality of positioning ribs 203A, extending approximately perpendicularly to the curved bottom of each groove 202, are formed on one surface of each partition wall 203 on the side that faces unrecorded face 201A of disc 201. The surface of the other partition wall 203 forming each groove 202, that is, the side that faces recorded face 201B of disc 201, includes an untapered portion 203B coinciding with an annular unrecorded area of width w at the edge of recorded face 201B of each CD. Furthermore, a pair of V-shaped disc-gripping parts 203C are formed at the end of each groove 202 opposite the end adjacent slotted flange 204, where partition walls 203 terminate.

When a disc 201 is placed in disc holding groove 203 in the direction of the arrow E, as shown in FIG. 4(a), its unrecorded surface 201A and the unrecorded annular area of recorded surface 201B adjacent its edge come into sliding contact with positioning ribs 203A of one partition wall 203 and untapered portion 203B of the other partition wall 203 forming groove 202. During its movement into groove 202, the recorded portion of face 201B is protected from contact with tray 200 because of the tapering of partition wall 203. When a disc is completely accommodated in a groove 202, its edge is gripped by gripping members 203C, and the disc is held approximately vertically. Even a CD that exhibits a variable thickness, due, for example, to unavoidable errors in the molding process, can be located securely in its proper vertical position by gripping members 203C.

With reference to FIG. 5, the operations of loading and unloading tray 200 now will be described. A pair of tray supporters 253 and 254 are mounted on main chassis 106 on the left and right sides, respectively, as seen in FIG. 5. Tray supporters 253, 254 each include tray guide pin 255, upper engaging pin 256, and lower engaging pin 257 mounted on the inwardly directed face (in FIG. 5, only pins 255, 256 and 257 mounted on left side tray supporter 253 are shown). Tray guide pins 255 cooperate with guide grooves 208 of tray 200 when tray 200 is loaded. Tray supporters 253 and 254 further include tray guide rails 258, which cooperate with the undersides of tray guide rails 209 of tray 200.

As depicted in FIG. 5, upper engaging pins 256 are longer than lower engaging pins 257. Upper engaging pin 256 is of sufficient length to interfere with side portion 206B of disc retention lever 206, while lower engaging pin 257 is long enough to interfere with flange 206C but too short to interfere with side portion 206B.

Before tray 200 is loaded, disc retention lever 206 is pivoted in the direction of arrow G in FIG. 5 by the biasing force of spring 207. In this position, crossbar portion 206A of disc retention lever 206 prevents discs 201 from falling out of tray 200. When tray 200 is loaded into disc storage section 101 in the direction of arrow D in FIG. 5, each flange 206C engages with an upper engaging pin 256, and disc retention lever 206 is pivoted in the direction of arrow H. As tray 200 approaches its fully loaded position, disc retention lever 206 is pivoted to the position indicated by the broken lines of FIG. 5, and each flange 206C passes between its respective engaging pins 256 and 257. As flanges 206C pass upper engaging pins 256, disc retention lever 206 pivots slightly in the direction of the arrow G due to the biasing force of the spring 207, and each upper engaging pin 256 engages with a step 206D, which extends from side portion 206B adjacent flange 206C, to lock tray 200 in disc storage section 101 between tray supporters 253 and 254, as shown in FIG. 2. When tray 200 is thus locked, the CDs stored in tray 200 no longer are held by disc retention lever 206, and transfer mechanism 600 is able to carry a selected disc 201 to playback mechanism 700 of disc playback unit 400.

To unload tray 200, crossbar portion 206A of disc retention lever 206 is pushed down against the biasing force of spring 207 and tray 200 is pulled in the direction of arrow C in FIG. 5. When disc retention lever 206 is pressed down, step 206D disengages from upper retaining pin 256, and flange 206C engages with lower engaging pin 257. As tray 200 is pulled further in the direction of arrow C in FIG. 5, flange 206C is forced to pivot in the direction of arrow G by lower engaging pin 257 and by spring 207, and the operator can remove his hand from crossbar portion 206A. After flange 206C passed lower engaging pin 257, disc retention lever 206 is pivoted by the biasing force of spring 207 to the position indicated by the solid lines in FIG. 5.

FIGS. 2 and 5 show a second mechanism for retaining discs 201 in tray 200, which operates after tray 200 has been loaded in disc storage section 101. As seen in FIG. 2, wire 401 is guided by rollers 402 and 403 pivotally connected to left-side chassis 107 and by rollers 404 and 405 pivotally connected to right-side chassis 108 to form a substantially rectangular loop. As seen best in FIG. 5, one end of wire 401 is connected directly to disc playback unit 400 at wire anchor 407, and the other end is connected to disc playback unit 400 via spring 406. Referring again to FIG. 2, wire 401 travels counterclockwise when disc playback unit 400 moves in the direction of arrow A and clockwise when disc playback unit 400 moves in the direction of arrow B. Rollers 402, 404 are positioned to locate the uppermost segment of wire loop 401 at the front of tray 200 to prevent discs 201 from coming out of tray 200, except where the gap in wire loop 401 is located, that is, between wire anchor 407 and the attachment point of spring 406 to disc playback unit 400. It is through this gap that the selected CD is transferred from tray 200 to playback mechanism 700 of disc playback unit 400.

Figure 6:
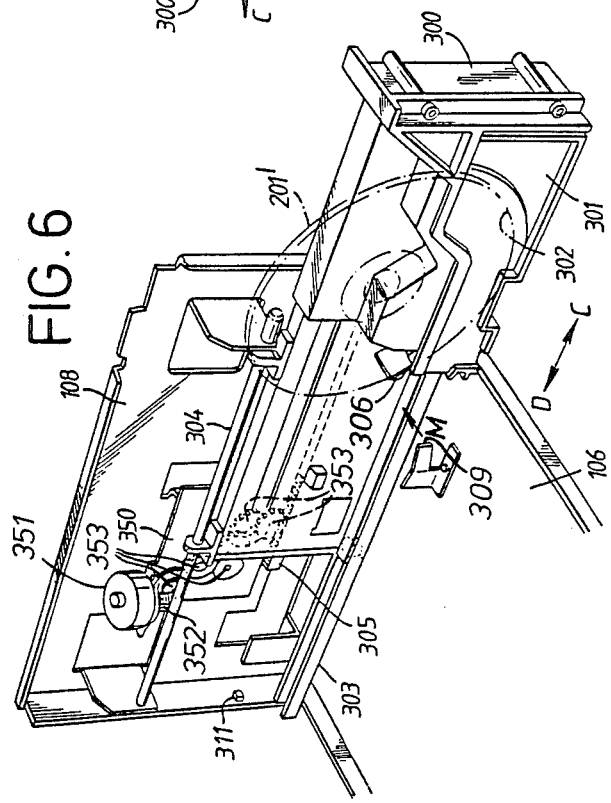
FIG. 6 is a perspective view of the temporary disc loading mechanism shown in FIG. 2.

FIG. 6 shows temporary disc loading mechanism 300, which includes temporary disc loader 301. Temporary disc loader 301 includes disc holding groove 302 shaped for holding a single disc 201' vertically. Temporary disc loader 301 is slidably supported on guide rail 303, which is mounted on main chassis 106, and guide rod 304, which is mounted on right-side chassis 108. Guide rail 303 and guide rod 304 are positioned parallel to each other and permit temporary disc loader 301 to slide in the direction of arrows C and D in FIG. 6. Temporary disc loader 301 is driven along guide rail 303 and guide rod 304 by temporary disc loader driving mechanism 350. Temporary disc loader driving mechanism 350 includes motor 351, worm gear 352 mounted on a driving shaft of motor 351, gears 353, and rack 305 formed on temporary disc loader 301. When temporary disc loader 301 is located at the front of housing 100, as shown in FIG. 6, disc 201' held in disc holding groove 302 is prevented from falling out of disc holding groove 302 by disc retention lever 306. Disc retention lever 306 is pivotally connected to temporary disc loader 301 and is biased in the direction of arrow M to interfere with the open end of disc holding groove 302. When, therefore, temporary disc loader 301 has been driven in the direction of arrow C to a position at the front of housing 101, retention lever 306 is rocked in the direction of arrow M to prevent disc 201' from falling out of disc holding groove 302.

Figure 7:
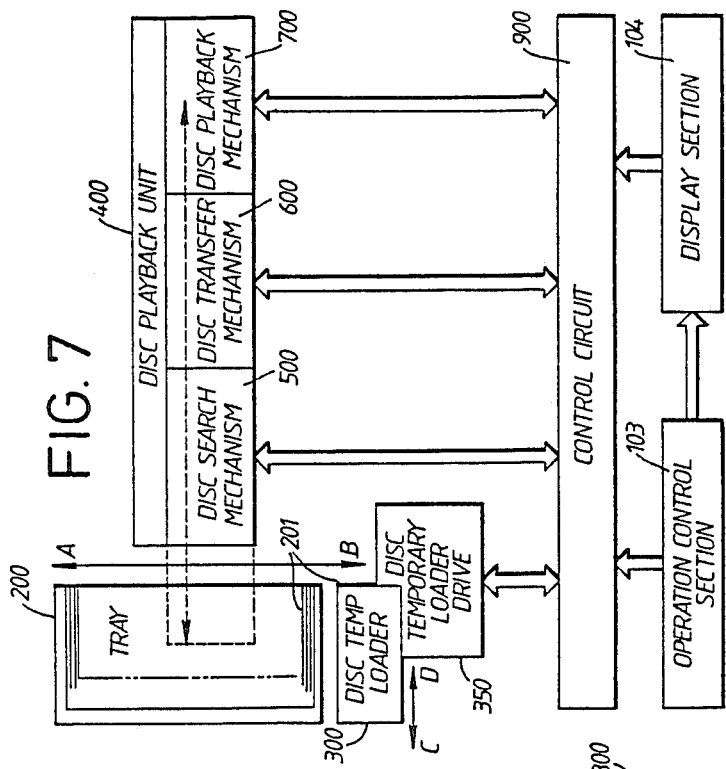
FIG. 7 is a block diagram illustrating the controlling operations of the autochanger type disc player of the present invention.

FIG. 7 illustrates diagramatically a control circuit for disc playback unit 400. Control circuit 900 is coupled to temporary disc loader driving mechanism 350 and to search mechanism 500, transfer mechanism 600, and playback mechanism 700 of disc playback unit 400. Control circuit 900 controls mechanisms 350, 500, 600, and 700 in accordance with signals from operation control section 103 on the front panel of housing 100. Display section 104 on the front panel of housing 100 (see FIG. 1) is connected to operation control section 103 and control circuit 900 to display data from operation control section 103 and control circuit 900. To locate the CD to be selected for playback from tray 200, an address signal from control circuit 900 is applied to search mechanism 500. Search mechanism 500 drives disc playback unit 400 across tray 200 and temporary disc loading mechanism 300 to search for and locate the selected disc. After completion of the search operation, transfer mechanism 600 takes the selected disc from tray 200 or from temporary disc loading mechanism 300 and transfers the disc to playback mechanism 700 under the control of control circuit 900. Then playback mechanism 700 holds the selected disc for playback operation under the control of the control circuit 900. Control circuit 900 also controls playback mechanism 700 and transfer mechanism 600 of disc playback unit 400 to return the selected disc to its original place or to another suitable place newly addressed by control circuit 900.

Figure 8:
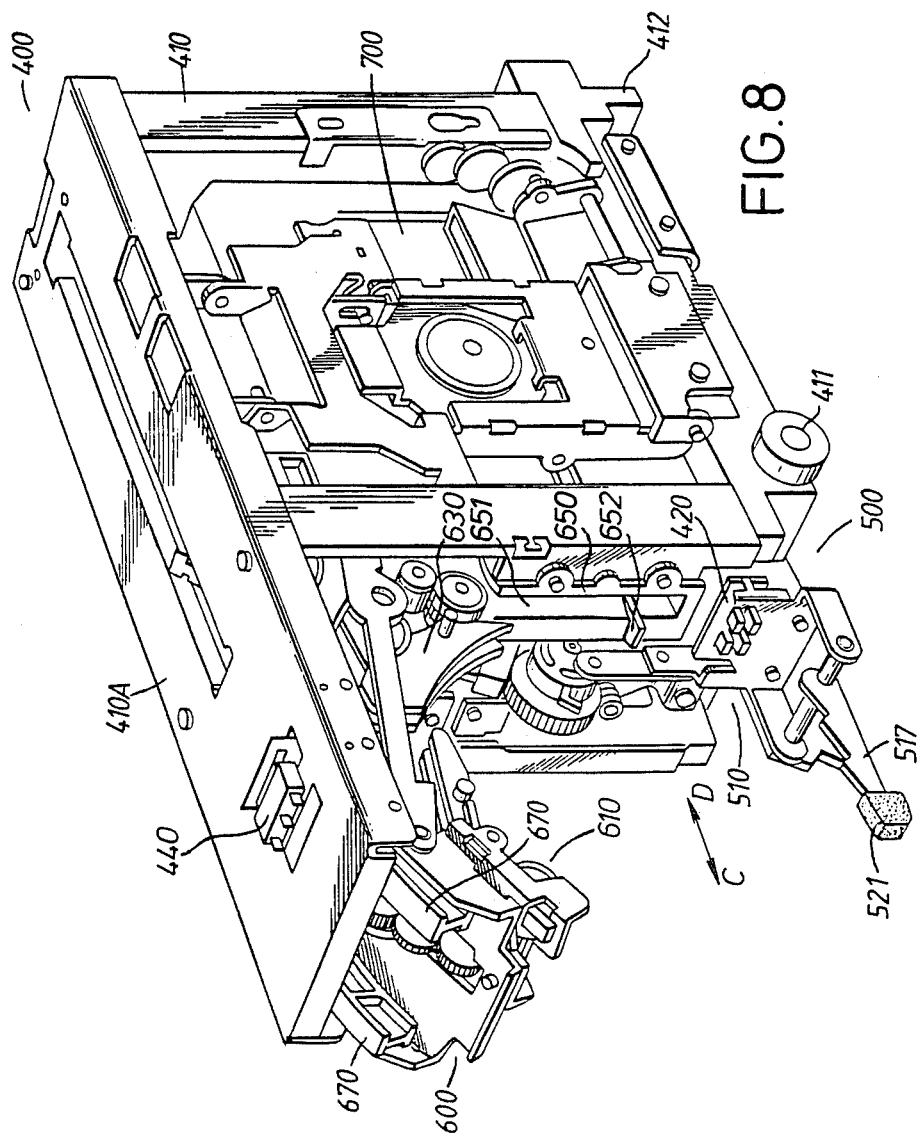
FIG. 8 is a perspective view of the disc playback unit shown in FIG. 2.

FIG. 8 shows the mechanical structure of disc playback unit 400. The bottom part of the frame 410 includes bearing 411 and slider 412, which are slidably engaged with, respectively, guide rod 413 and guide rail 414 mounted on and extending across housing 100, as shown in FIG. 5. Search mechanism 500, transfer mechanism 600, and playback mechanism 700 are mounted on frame 410 of disc playback unit 400. Search mechanism 500 is mounted at the front of disc playback unit 400, as seen in FIG. 8, adjacent tray 200 loaded in housing 100. Search mechanism 500 includes disc lifting mechanism 510. Above disc lifting mechanism 510, transfer mechanism 600 is mounted to frame 410. On the side of search mechanism 500 and transfer mechanism 600 opposite tray 200, playback mechanism 700 is mounted.

Slot detector 420, comprised of a pair of photo-couplers, is mounted on frame 410 near search mechanism 500. Slot detector 420 faces slotted flange 204 of tray 200 when tray 200 is loaded in housing 100 (see FIG. 3) and detects the slot 205 aligned with the disc holding groove 202 containing the disc to be selected for playback. The pair of the photocouplers of slot detector 420 differentially detect the exact position of the correct slot 205. When slot detector 420 aligns with slot 205 corresponding to the selected CD, playback unit 400 is in position for the removal and playing of the selected disc. Thus, when slot detector 420 is aligned with slot 205 corresponding to the selected disc, pad portion 521 at the end of lifting finger 517 of disc lifting mechanism 510 is aligned for engaging the selected disc.

Transfer mechanism 600 includes first and second disc transfer sections 610, 630, which engage the selected disc during its transfer from tray 200 to playback mechanism 700. First sensor switch 440 is mounted on top plate 410A of frame 410 and senses the start loading position (that is, the position for retrieving the selected disc from tray 200) of first and second disc transfer sections 610 and 630. First sensor switch 440 is located between guide rails 670 on top plate 410A. After a selected disc has been played and returned to its place in tray 200 by transfer mechanism 600, first sensor switch 440 detects when first disc transfer section 610 has been shifted to its furthest position in the direction of arrow C and turns off the loading drive motor, so that the disc transfer operation can be completed. The selected disc passes through disc inlet 651 of fixed guide 650 during the transfer operation.

Figure 9:
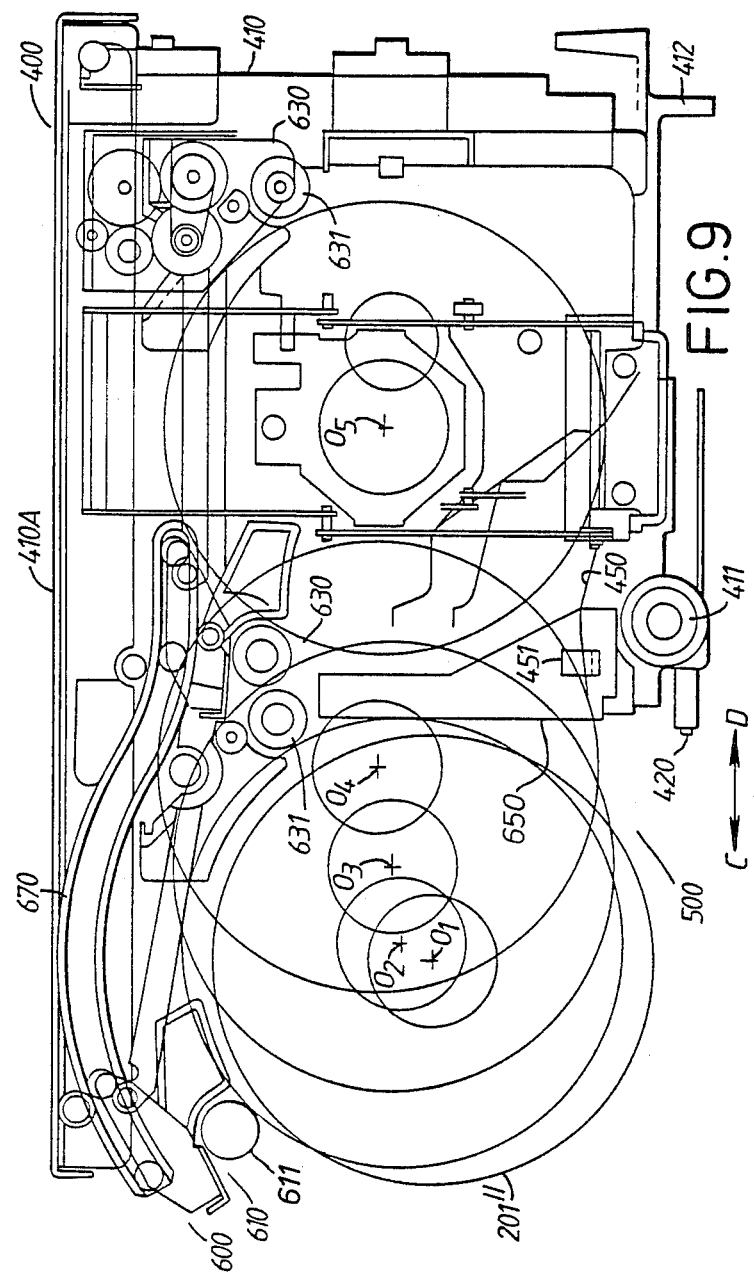
FIG. 9 is a composite elevational view illustrating the disc transferring operation of the disc playback unit shown in FIG. 8.

With reference to FIG. 9, the operation of transfer mechanism 600 now will be explained in detail. At the commencement of loading selected disc 201" into playback mechanism 700, transfer mechanism 600 is located above disc tray 200, to the left in FIG. 9. Prior to the operation of transfer mechanism 600, selected disc 201" is lifted by pad portion 521 of lifting finger 517 of disc lifting mechanism 510 (see FIG. 8) from position $O_1$ in tray 200 to position $O_2$ ($O_1$ through $O_5$ indicate positions of the center of selected disc 201" during its transfer from tray 200 to playback mechanism 700).

In position $O_2$, disc 201" engages transfer mechanism 600. More specifically, the edge of selected disc 201" engages both roller 611 of first disc transfer section 610 and roller 631 of second disc transfer section 630. Then, a motor and geartrain mechanism (not shown) rotates rollers 611, 631 counterclockwise with respect to FIG. 9. Consequently, disc 201" rotates clockwise, rolls out of tray 200, moves in succession to positions $O_3$ and $O_4$, and rolls through fixed guide 650. After disc 201" is rolled past position $O_4$, it reaches bank 450 formed in the disc transfer path of disc playback unit 400, and rolls by gravity into position $O_5$ in playback mechanism 700. When disc 201" passes through fixed guide 650, disc passage detector 451 detects the passage of selected disc 201" and activates playback mechanism 700 to play the disc. After the completion of the playback operation, transfer mechanism 600 engages the edge of disc 201" at rollers 611, 631, and the motor rotates rollers 611, 631 in the clockwise direction. Consequently, disc 201" is rotated counterclockwise and rolls back into its original groove in tray 200.

Each disc 201 is given a specular finish on its recorded side 201B in the disc manufacturing process. As shown in FIG. 10, the manufacturing process normally produces a slight projection or burr 201C on the circumferential edge of the non-recorded side 201A. Consequently, as shown in FIGS. 11(a) and 11(b), a part of the edge of recorded face 201B of selected disc 201" held in tray 200 occasionally catches on projection 201C of adjacent disc 201. Therefore, without some modification of transfer mechanism 600, the adjacent, unselected CD often would be carried into playback mechanism 700 along with selected disc 201".

To solve this problem, the autochanger type disc player of the present invention includes means for preventing a plurality of discs from being transferred simultaneously from tray 200 to playback mechanism 700. As embodied herein, the means for preventing a plurality of discs from being transferred simultaneously comprises fixed guide 650, which is shown connected to disc playback unit 400 in FIG. 8 and is shown in detail in FIG. 12. Fixed guide 650 includes disc inlet 651, which is approximately V-shaped and through which selected disc 201" passes when moving between tray 200 and playback mechanism 700. Fixed guide 650 also includes restraining member 652, which prevents the simultaneous movement of a plurality of discs through disc inlet 651. Restraining member 652 is provided on fixed guide 650 on the side of disc inlet 651 that corresponds to the recorded face 201B of selected disc 201" passing through disc inlet 651.

As shown in FIG. 13(b), restraining member 652 is positioned approximately midway between the center and bottom edge of discs 201 held in tray 200. The end of restraining member 652 projects from the forward face 655 of fixed guide 650 toward tray 200 beyond the vertical tangent of discs 201, represented by line L in FIG. 13(b), and extends above the edge of partition walls 203 of tray 200. As seen in FIG. 13(a), when disc playback unit 400 is properly aligned with the groove 202 of selected disc 201", edge 654 of restraining member 652 is positioned so that an adjacent CD sticking to the recorded side 201B of the selected CD would be prevented from entering disc inlet 651 together with selected disc 201". Restraining member 652 contacts the unselected disc 201 and separates it from selected disc 201" entering disc inlet 651. The unselected disc then returns to its original disc holding groove 202 in tray 200, gravity forcing the disc to roll back its downward sloping groove 202.

Thus, the autochanger type disc player of the present invention prevents a plurality of CDs in tray 200 from being fed into disc playback unit 400 at the same time. This is achieved by providing disc inlet 651 with restraining member 652. By this means, even if a plurality of discs 201 are fed from tray 200, they can be reliably restrained in such a way that only selected disc 201" can pass through disc inlet 651. This permits an increased number of more closely spaced discs to be stored in tray 200 and, in turn, promotes increased reliability of operation.

The restraining member of the invention is not limited to the foregoing embodiment. The same effectiveness can be achieved by extending restraining member 652 to the bottom of the disc inlet 651 as shown in FIGS. 14(a) and 14(b). A further improvement in effectiveness may be anticipated by adopting a construction in which restraining members 652A, 652B are provided on both sides of disc inlet 651, as shown in FIGS. 15(a) and 15(b).

The autochanger type disc player of the present invention also is provided with means for preventing recorded face 201B of selected disc 201" from contacting non-resilient portions of the disc player by constraining selected disc 201" in a vertical position during its transfer from tray 200 to playback mechanism 700. Without such means, selected disc 201" might tilt towards its recorded face 201B and contact fixed guide 650 or some other non-resilient component, damaging recorded face 201B. As embodied herein, the means for preventing the recorded portion of selected disc 201" from contacting non-resilient portions of the disc player during disc transfer includes buffer part 653 comprised of a shock-absorbing material such as bristles, felt, or rubber provided on fixed guide 650 on the side of disc inlet 651 that corresponds to recorded face 201B of selected disc 201" passing through disc inlet 651.

Referring now to FIGS. 16(a) and 16(b), buffer part 653 is positioned above the bottom of V-shaped disc inlet 651 to coincide approximately with the center of selected disc 201" passing through disc inlet 651. The free end of buffer part 553 projects across disc inlet 651 to approximately the middle of disc inlet 651. Preferably, the free end of buffer part 653 is directly above nearer corner 651A of the bottom of disc inlet 651, so that recorded face 201B of selected disc 201" is maintained in a vertical position. As shown in FIG. 14(b), the base of buffer part 653 is supported in recess 650A of fixed guide 650 to enable the use of bristles or pieces of felt or rubber having a high length-to-thickness ratio. A buffer part so comprised will have a relatively low rigidity and will easily deform in reaction to loading by recorded face 201B of selected disc 201". Thus, when selected disc 201" passes through disc inlet 651, its recorded face 201B deforms and slides over buffer part 653 instead of contacting the edge of fixed guide 650 and damaging the surface of recorded face 201B.

Thus, the autochanger disc player of the present invention prevents recorded face 201B of selected disc 201" from contacting non-resilient components of the disc player during transfer from tray 200 to playback mechanism 700. Preventing scratching and gouging of discs 201 during disc transfer operation is particularly important with optical discs because such extraneous marks will be confused with the pits and depressions intended to provide digitized data to the disc player.

The buffer part of the invention is not limited to the foregoing embodiment. Improved effectiveness can be achieved by a pair of buffer parts 553A and 553B provided on both sides of disc inlet 551, as shown in FIG. 17. A further improvement in effectiveness can be anticipated when, as shown in FIG. 18, disc inlet 551 is a double V-shaped or diamond-shaped inlet provided with a pair of buffer parts 553A on one side and a pair of buffer parts 553B on the other side. The pairs of buffer parts engage the selected CD both above and below its central hole.

The alternative embodiments shown in FIGS. 17 and 18 are particularly suitable for use with discs that are recorded on both sides, unlike presently available CDs. The effectiveness of buffer parts 553A, 553B can be improved further by using bristles or felt of greater stiffness or by narrowing the gap between cooperating buffer parts 553A, 553B to a dimension less than the thickness of selected disc 201" passing between them. Such measures further constrain the lateral movement of selected disc 201″ and help guard against the selected disc contacting nonresilient components of the disc player.

It will be apparent to those skilled in the art that modifications and variations can be made in the autochanger type disc player of this invention. In addition, the invention is not limited to use with compact audio discs having data recorded only on one face. The invention is applicable, for example, to multi-disc video disc players, optical disc document file systems, and to discs containing recorded data on both faces. The invention in its broader aspects is, therefore, not limited to the specific details and illustrated examples shown and described. Accordingly, departure can be made from such details without departing from the spirit of applicant's general inventive concept.

What is claimed is:

1. An autochanger type disc player, comprising:
   means for storing a plurality of closely spaced, parallel discs;
   means for playing said discs;
   means for transferring a selected one of said discs from said disc storing means to said disc playing means, said disc transferring means being movable along said plurality of discs in said disc storing means and including a disc guide having a disc inlet alignable with said selected disc in said disc storing means, said disc guide having a forward face portion facing said disc storing means, said selected disc passing through said disc inlet during transfer of said selected disc from said disc storing means to said disc playing means; and
   restraining means for preventing discs other than said selected disc from entering said disc inlet, said restraining means including a restraining member connected to one side of said disc inlet and projecting from said forward face portion of said disc guide toward said disc storing means.

2. The disc player of claim 1, wherein said disc inlet is V-shaped and said restraining member is positioned above the bottom of said disc inlet by a distance less than the radius of one of said discs.

3. The disc player of claim 1, wherein said disc inlet is V-shaped and said restraining member extends from the bottom of said disc inlet to a point positioned above said bottom of said disc inlet by a distance less than the radius of one of said discs.

4. The disc player of claim 1, wherein discs are recorded on one side only and said restraining member is connected to the side of said disc inlet corresponding to the recorded side of said selected disc passing through said disc inlet.

5. The disc player of claim 1, wherein said restraining means includes two restraining members, each connected to an individual side of said disc inlet and projecting from said forward face portion of said disc guide toward said disc storing means.

6. An autochanger type disc player, comprising:
   means for storing a plurality of closely spaced, parallel discs;
   means for playing said discs;
   means for transferring a selected one of said discs from said disc storing means to said disc playing means, said disc transferring means being movable along said plurality of discs in said disc storing means and including a disc guide having a disc inlet alignable with said selected disc in said disc storing means, said selected disc passing through said disc inlet during transfer of said selected disc from said disc storing means to said disc playing means; and
   buffer means for preventing the recorded portion of said selected disc from contacting non-resilient portions of said disc player when said selected disc is being transferred from said disc storing means to said disc playing means, said buffer means including a buffer part formed of a resilient material projecting from one side of said disc inlet approximately to the center of said disc inlet.

7. The disc player of claim 6, wherein said disc inlet is V-shaped and said buffer part is positioned above the bottom of said disc inlet by a distance approximately equal to the radius of one of said discs.

8. The disc player of claim 6, wherein said disc guide includes a recess in one side of said disc inlet and said buffer part is mounted in said recess.

9. The disc player of claim 6, wherein said disc inlet is V-shaped and said buffer means includes two buffer parts formed of a resilient material, each connected to an individual side of said disc inlet and having a projecting end projecting approximately to the center of said disc inlet.

10. The disc player of claim 9, wherein said projecting ends of said buffer parts are separated by a gap having a dimension less than the thickness of one of said discs.

11. The disc player of claim 6, wherein said disc inlet is diamond shaped, and said buffer means includes first and second buffer parts formed of a resilient material extending from opposite sides of said disc inlet approximately to the center of said disc inlet, said first and second buffer parts being positioned above the bottom of said disc inlet by a distance less than the radius of one of said discs, and third and fourth buffer parts formed of a resilient material extending from opposite sides of said disc inlet, said third and fourth buffer parts being positioned above the bottom of said disc inlet by a distance greater than the radius of one of said discs and less than the diameter of one of said discs.

12. The disc player of claim 6, wherein said buffer part is formed of bristles.

13. The disc player of claim 6, wherein said buffer part is formed of felt.

14. The disc player of claim 6, wherein said buffer part is formed of rubber.

15. An autochanger type disc player, comprsing:
   means for storing a plurality of closely spaced, parallel discs;
   means for playing said discs;
   means for transferring a selected one of said discs from said disc storing means to said disc playing means, said disc transferring means being movable along said plurality of discs in said disc storing means and including a disc guide having a disc inlet alignable with said selected disc in said disc storing means, said disc guide having a forward face portion facing said disc storing means, said selected disc passing through said disc inlet during transfer of said selected disc from said disc storing means to said disc playing means;
   restraining means for preventing discs other than said selected disc from entering said disc inlet, said restraining means including a restraining member connected to one side of said disc inlet and projecting from said forward face portion of said disc guide toward said disc storing means; and
   buffer means for preventing the recorded portion of said selected disc from contacting non-resilient portions of said disc player when said selected disc is being transferred from said disc storing means to said disc playing means.

* * * * *